United States Patent

Iwase et al.

[11] Patent Number: 5,449,706
[45] Date of Patent: Sep. 12, 1995

[54] AQUEOUS COATING COMPOSITION FOR PLASTICS SUBSTRATES AND COATING METHOD

[75] Inventors: Osamu Iwase; Tuguo Nezu; Kazuhiko Ohira, all of Hiratsuka, Japan

[73] Assignee: Kansai Paint Company, Limited, Amagasaki, Japan

[21] Appl. No.: 229,331

[22] Filed: Apr. 12, 1994

Related U.S. Application Data

[63] Continuation of Ser. No. 728,474, Jul. 11, 1991, abandoned.

[30] Foreign Application Priority Data

Jul. 12, 1990 [JP] Japan .................. 2-185071

[51] Int. Cl.⁶ .................. C08K 3/20; C08L 63/02
[52] U.S. Cl. .................. 523/409; 523/410; 525/65; 525/66
[58] Field of Search .................. 523/409, 410; 525/65, 525/66

[56] References Cited

U.S. PATENT DOCUMENTS 4,373,177  2/1983  Hsu et al. .
4,374,177  2/1983  Hshu et al. .................. 428/392
4,728,573  3/1988  Temple .................. 428/378
4,863,988  9/1989  Inagaki et al. .................. 524/315

FOREIGN PATENT DOCUMENTS 0285898 10/1988 Germany .

OTHER PUBLICATIONS

Morrison & Boyd, Organic Chemistry, (1966) p. 1073.

*Primary Examiner*—Melvyn I. Marquis
*Assistant Examiner*—D. Aylward
*Attorney, Agent, or Firm*—Armstrong, Westerman, Hattori, McLeland & Naughton

[57] ABSTRACT

An aqueous coating composition for a plastic substrate which is a dispersion in (a) an aqueous medium of the following components:

- (b) 5–40 wt. %, calculated as resin solids, of a water-miscible olefin resin modified with a carboxyl-containing unsaturated monomer;
- (c) 90–40 wt. %, calculated as resin solids, of at least one water-miscible urethane resin;
- (d) 5–20 wt. %, calculated as resin solids, of a water-miscible epoxy resin; and
- (e) optionally a pigment.

30 Claims, No Drawings

AQUEOUS COATING COMPOSITION FOR PLASTICS SUBSTRATES AND COATING METHOD

This application is a continuation of application Ser. No. 07/728,474 filed Jul. 11, 1991, now abandoned.

The present invention relates to aqueous coating compositions for plastics substrates and a coating method.

Moldings of plastics, especially of polypropylene resin, are in wide use as base materials for motor vehicles, household electric appliances and common industrial applications. To give colors and durability to polypropylene resin moldings, coating compositions for plastics are applied to the surfaces of such moldings.

However, coatings prepared from these compositions are generally poor in adhesion to polypropylene resin. It is therefore practice to apply an undercoat composition to polypropylene resin to improve the adhesion.

Usually used as such an undercoat composition is a solution prepared by dissolving chlorinated polypropylene or like polyolefin resin in an organic solvent.

Nevertheless, the polyolefin resin is given such a high molecular weight that even when the composition is applied to substrates which are deformed by an external force, the resulting coating remains free of cracking, scaling or like defects. Accordingly, if it is attempted to dilute the resin to a viscosity suited to coating, there arises a need to use a large amount of organic solvent. The composition therefore contains a larger amount of organic solvent than conventional coating compositions of the organic solvent type. Consequently, when the undercoat composition is used, the vaporization of the solvent entails problems as to safety, sanitation, environmental pollution and hazards of fire and explosion. The undercoat composition has another problem in that the coating formed by the composition has insufficient adhesion to the overcoat.

Unexamined Japanese Patent Publication SHO 59-113015 discloses an aqueous undercoat composition which is free from organic solvent and which comprises an aqueous polyurethane resin composed of polyoxytetramethylene glycol as its polyol component. However, the coating formed of this composition has the problem of having poor in adhesion to polypropylene resin.

SUMMARY OF THE INVENTION

The main object of the present invention is to provide an aqueous coating composition which is capable of forming coatings having excellent adhesion to plastics substrates and overcoats, and a method of forming coatings with use of the composition.

The above and other objects of the present invention will become apparent from the following description.

The coating composition of the present invention comprises an aqueous medium having dispersed therein a water-miscible vehicle component comprising an olefin resin, a urethane resin and an epoxy resin.

Our research has revealed that the above aqueous coating composition of the invention forms coatings which exhibit excellent adhesion to plastics substrates and to overcoats. Moreover, the composition itself has high storage stability, while the coating prepared from the composition has high resistance to bending and water in addition to the above characteristics and is highly smooth-surfaced to give an excellent appearance to the overcoat or top coat.

The term "dispersed" as used herein and in the appended claims for the vehicle component is used not only as meaning that the vehicle component is dispersed in an aqueous medium but also as including the case wherein the vehicle component is dissolved in the medium. Further the terms "water-miscible" and "water-miscibility" are used for the vehicle component as including both "water-soluble" and "water-dispersible."

The olefin resin for use in the present composition is a polymer consisting essentially of an olefin monomer and/or a diene monomer. Examples of useful olefin resins are propylene-ethylene copolymer, chlorinated polypropylene, EPDM (ethylene-propylene-diene copolymer), polybutadiene, styrene-butadiene copolymer, acrylonitrile-butadiene copolymer, etc., and modified polyolefins obtained by modifying these polymers or copolymers with a carboxyl-containing polymerizable unsaturated monomer such as maleic acid, maleic anhydride, acrylic acid, methacrylic acid or the like. The modified polyolefin include polymers obtained by the addition of a carboxyl-containing unsaturated monomer to a polyolefin, and polymers obtained by graft-polymerizing a carboxyl-containing unsaturated monomer with a polyolefin. Among the above olefin resins, it is desirable to use the modified polyolefin which is prepared by the addition of maleic acid or maleic anhydride to chlorinated polypropylene, because the chlorinated polypropylene component exhibits excellent adhesion to propylene substrates and because the maleic acid or anhydride component exhibits excellent adhesion to overcoats and has high resistance to water. These features of the components result in the advantage that the adhesion of the modified polyolefin is less susceptible to deterioration. Preferably the chlorinated-polypropylene has a chlorination ratio of 20 to 30 wt. %. Maleic acid or anhydride, when used as the carboxyl-containing unsaturated monomer, can be used usually in an amount of about 0.5 to about 10 wt. %, preferably about 1 to about 5 wt. %, based on the modified olefin resin to be obtained. The modified olefin resin to be used in the present composition may be one prepared from the above olefin resin and a vinyl monomer other than the carboxyl-containing unsaturated monomer, by graft polymerizing the vinyl monomer with the resin. Examples of useful vinyl monomers are (meth)acrylic acid esters such as methyl (meth)acrylate, ethyl (meth)acrylate, butyl (meth)acrylate, 2-ethylhexyl (meth)acrylate and 2-hydroxyethyl (meth) acrylate, and aromatic vinyl compounds such as styrene, s-methyl styrene and vinyltoluene. These vinyl monomers can be used singly, or at least two of them are usable in admixture. The vinyl monomer is used preferably in an amount of up to 90 wt. % based on the modified olefin resin to be obtained.

The olefin resin to be used is about 3,000 to about 50,000, preferably about 10,000 to about 30,000, in number average molecular weight. When less than about 3,000 in molecular weight, the resin is not desirable since the coating obtained is liable to become tacky, permitting adhesion of dust or like extraneous matter, giving a poor appearance to the top coat finally formed or exhibiting impaired adhesion to plastics substrates after having been subjected to exposure to water. On the other hand, when greater than about 50,000 in molecular weight, the resin has the drawback of failing to form smooth coatings and is undesirable.

The urethane resin to be used in combination with the olefin resin is a urethane polymer obtained by reacting a compound (1) having at least two active hydrogen atoms in the molecule on the average with a polyisocyanate compound (2), or a urethane polymer obtained by reacting the compound (1) with the compound (2) in the presence of an excessive amount of isocyanate groups to obtain an isocyanate-containing prepolymer, and reacting the prepolymer with a chain-lengthening agent. The urethane resin may have carboxyl incorporated therein.

Any compound is usable as compound (1) as long as it has at least two active hydrogen atoms (preferably hydroxyl groups) in the molecule on the average. Examples of such compounds are as follows.

(i) Diol compounds such as ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane diol, 2,5-hexanediol, dipropylene glycol, 2,2,4-trimethyl-1,3-pentanediol, tricyclodecane dimethanol, 1,4-cyclohexane dimethanol and the like.

(ii) Polyether diols such as alkylene oxide adducts of the above diol compounds (i), those obtained by subjecting alkylene oxides, cyclic ethers (e.g., tetrahydrofuran) or the like to ring opening polymerization or ring opening copolymerization (block or random copolymerization), examples being polyethylene glycol, polypropylene glycol, ethylene glycol-propylene glycol copolymer (block or random), polytetramethylene glycol, polyhexamethylene glycol, polyoctamethylene glycol and the like.

(iii) Polyester diols including those prepared from a dicarboxylic acid (or anhydride) [such as adipic acid, succinic acid, sebacic acid, glutaric acid, maleic acid, fumaric acid or phthalic acid] and a glycol [such as ethylene glycol, propylene glycol, 1,4-butanediol, 1,6-hexanediol, 1,8-octamethylenediol, neopentyl glycol, bis(hydroxymethyl) cyclohexane, bis(hydroxyethyl)benzene, alkyldialkanolamine, m-xylylene glycol, 1,4-bis(2-hydroxyethoxy)benzene or 4,4'-bis(2-hydroxyethoxy)-diphenylpropane], by subjecting the acid or anhydride and the glycol to condensation polymerization in the presence of an excess of hydroxyl, examples being ethylene glycol-adipic acid condensation polymer, butanediol-adipic acid condensation polymer, hexamethylene glycol-adipic acid condensation polymer, ethylene glycol-propylene glycol-adipic acid condensation polymer and condensation polymers of bis(hydroxymethyl)cyclohexane and a mixture of $C_4$-$C_8$ straight-chain dicarboxylic acids (e.g., K-FLEX-148 and -188, products of King Industries Inc. Co.). Also useful are polylactonediols obtained by subjecting a lactone to ring opening polymerization using a glycol as an initiator (such as polycaprolaconediol prepared using ethylene glycol as an initiator).

(iv) Polyether ester diols prepared by reacting an ether-containing diol (such as above-mentioned polyether diol, diethylene glycol, triethylene glycol or dipropylene glycol) or a mixture of the diol and other glycol with the above-mentioned dicarboxylic acid (or anhydride) for condensation polymerization, or reacting the diol or the mixture with the acid (or anhydride) and an alkylene oxide, examples being polytetramethylene glycol-adipic acid condensation polymer, etc.

(v) Polycarbonate diols such as compounds represented by the formula

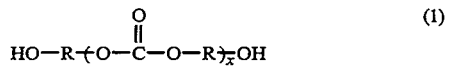

wherein R is the residue of a $C_1$ to $C_{12}$ saturated aliphatic diol, and x is the number of repeating units in the molecule and is usually an integer of 5 to 50. These compounds are prepared, for example, by the ester exchange method wherein a saturated aliphatic diol having aliphatic hydrocarbon group of 1 to 12 carbon atoms (such as 1,4-butanediol, 1,5-pentanediol, 1,6-hexanediol, diethylene glycol, tetraethylene glycol, dipropylene glycol, co-condensation polymer of ethylene glycol and propylene glycol, etc.) is reacted with a substituted carbonate (such as diethyl carbonate, diphenyl carbonate, etc.) in the presence of an excess of hydroxyl, or by a process wherein the above saturated aliphatic diol is reacted with phosgene and which, when required, may be followed by the reaction of the product with a saturated aliphatic diol.

The diols (i) to (v) given above can be used singly, or at least two of them are usable in combination. Among the diols (i) to (v), preferable are diols (i) to (iii), among which more preferable are those having a number average molecular weight of up to about 5000, especially about 1000 to about 3000.

The urethane resin for use in the present composition may be prepared using, in addition to the above diol, a small amount of a low-molecular-weight polyol (vi) containing at least three hydroxyl groups in the molecule (preferably up to 500 in number average molecular weight) as a component having at least two active hydrogen atoms in the molecule on the average.

The use of the low-molecular-weight polyol (vi) entails, for example, the following advantage. Since the polyol forms branches on the molecular skeleton of the urethane resin, a three-dimensional structure can be given to the urethane resin, permitting polyurethane particles to form an aqueous dispersion of improved stability and giving the coating formed higher resistance to water and chemicals.

Examples of useful low-molecular-weight polyols (vi) are trimethylolpropane, trimethylolethane, glycerin, tris-2-hydroxyethyl isocyanurate, pentaerythritol, etc. The polyol (vi) can be used in an amount of up to about 0.1 mole per mole of the diol. Use of more than about 0.1 mole of the polyol is not desirable since the coating formed will have impaired physical properties.

The polyisocynate compound (2) to be reacted with the active hydrogen containing compound (1) is an aliphatic, alicyclic or aromatic compound containing at least two isocyanate groups in the molecule on the average. Examples of aliphatic diisocyanate compounds are those having 1 to 12 carbon atoms such as hexamethylene diisocyanate, 2,2,4-trimethylhexane diisocyanate, lysine diisocyanate, etc. Examples of alicyclic diisocyanate compounds are those having 4 to 18 carbon atoms such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate, isopropylidenedicyclohexyl-4,4'-diisocyanate, etc. Examples of aromatic diisocyanates are tolylene diisocyanate, 4,4'-diphenylmethane diisocyanate, xylylene diisocyanate and m-xylylene diisocyanate. Examples of polyisocyanate compounds having at least three isocyanate groups are triphenylmethane-4,4',4"-triisocyanate, 1,3,5-triisocyanatobenzene, 2,4,6-triisocyanatotoluene, 4,4'-dimethyldiphenylmethane -2,2',5,5'-tetraisocyanate and the like. Also useful are biuret type adducts, isocyanuric ring type adducts and modified products(-carbodiimide-, urethodion- and urethoimine-containing modified products) of the above diisocyanates. These polyisocyanates can be used singly, or at least two of them are usable in admixture.

Any of conventional methods is usable for introducing carboxyl into the urethane resin. For example, it is suitable to introduce carboxyl into the polyether diol (ii), polyester diol (iii) or polyether ester diol (iv) by replacing the glycol compound partly or entirely by a dimethylolalkanoic acid, or to introduce carboxyl into the urethan resin by using the diol (i) or (v) as admixed with a dimethylolalkanoic acid. Examples of useful dimethylolalkanoic acids are dimethylolacetic acid, dimethylolpropionic acid, dimethylolbutyric acid and dimethylolvaleric acid, etc.

The urethane resin having carboxyl introduced thereinto can be dispersed in water without using any surfactant or with use of a reduced amount of surfactant and therefore has the advantage of giving improved water resistance to the coating obtained. The amount of carboxyl to be incorporated into the urethane resin is about 25 to about 150, preferably about 30 to about 100, more preferably about 50 to about 80, in terms of the acid value of the resin. If the acid value is smaller than about 25, there arises a need to use a surfactant to render the resin miscible in water with good stability, whereas acid values greater than about 150 are likely to give lower water resistance to the coating.

The urethane resin to be used is usually about 10,000 to about 100,000, preferably about 20,000 to about 50,000, in number average molecular weight. In the case where the urethane resin is prepared by reacting the active hydrogen-containing compound (1) with the polyisocyanate compound (2) to obtain an isocyanate-containing prepolymer, and lengthening the chain thereof, the prepolymer is about 1,000 to about 3,000 in number average molecular weight, and the molecular weight of the urethane resin is adjusted to the above range. The isocyanate-containing prepolymer is obtained by reacting the compounds (1) and (2) usually in such a ratio that the NCO/OH equivalent ratio is 1.1 to 1.9. When lower than about 10,000 in number average molecular weight, the urethane resin is liable to exhibit lower water resistance and impaired flexibility, whereas if the molecular weight is greater than about 100,000, the resin will settle or coagulate during the storage of the coating composition, producing defects such as seeding in the coating or impairing the smoothness of the coating.

The chain of the isocyanate-containing prepolymer can be lengthened by a known method, for example, by reacting the prepolymer with a chain-lengthening agent such as water, water-soluble polyamine, glycol or the like. When required a catalyst is usable for this reaction. The water-soluble polyamine to be used is one having a primary amino group and/or secondary amino group at least two in number per molecule. Examples of suitable polyamine compounds are ethylenediamine, tetramethylenediamine, hexamethylenediamine, xylylenediamine, diethylenetriamine, triethylenetetramine and like water soluble polyamine, piperazine and like water-soluble alicyclic polyamine, and mixtures of such polyamines. Examples of suitable glycols are ethylene glycol, propylene glycol, diethylene glycol, triethylene glycol, butanediol, hexanediol, trimethylolpropane and the like.

Examples of useful reaction catalysts are trimethylamine, triethylamine, triisopropylamine, tri-n-propylamine, tri-n-butylamine and like trialkylamines; N-methylmorpholine, N-ethylmorpholine and like N-alkylmorpholines; N-alkylvinylpyrrolidones; and mixtures of at least two of these compounds.

The epoxy resin for use in the present composition is a resin having at least one epoxy group in the molecule. As such, known epoxy resins are usable which include, for example, the polyglycidyl ether of a polyphenol which can be prepared by reacting the polyphenol with epichlorohydrin in the presence of an alkali.

Examples of useful polyphenols are bis(4-hydroxyphenyl)2,2-propane, 4,4'-dihydroxybenzophenone, bis(4-hydroxyphenyl)1,1-ethane, bis(4-hydroxyphenyl)-1,1-isobutane, bis(4-hydroxy-tert-butyl-phenyl)-2, 2-propane, bis (2-hydroxynaphthyl) mathane, 1,5-dihydroxynaphthalene and the like.

Also usable is an epoxy resin which is obtained by reacting the polyglycidyl ether of polyphenol with one of the above-mentioned polyphenols.

In place of the foregoing polyphenols, hydrogenated compounds are usable which are obtained by adding hydrogen to some or all of the double bonds of the aromatic ring of the polyphenol.

Other epoxy reins which are usable include polyglycidyl ethers of phenolic novolak resins and polyglycidylethers of polyhydric alcohols. Examples of such polyhydric alcohols are ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)-2,2-propane, sorbitol and the like.

Also usable are epoxy-containing acrylic polymers which are prepared by copolymerizing an epoxy-containing monomer, such as glycidyl acrylate or glycidyl methacrylate, with a polymerizable ethylenic unsaturated monomer, such as methyl acrylate, ethyl acrylate, butyl acrylate, methyl methacrylate, ethyl methacrylate, butyl methacrylate, acrylamide, methacrylamide, acrylonitrile, methacrylonitrile or styrene. Further usable are epoxidized polybutadiene and epoxidized polycycloalkenes.

Although the epoxy resin to be used in the present invention is not limited specifically in molecular weight and epoxy equivalent, the resin is usually 300 to 8,000, preferably 320 to 4,000, in number average molecular weight, and 100 to 4,000, preferably 150 to 2,000, in epoxy equivalent.

The composition of the present invention is prepared from a vehicle component comprising an olefin resin, urethane resin and epoxy resin by making the vehicle component miscible in water and dispersing the vehicle component in water. The vehicle component can be dispersed in water by any of the following methods.

I. By making each of the three resins water-miscible, dispersing each resin in water and mixing the dispersions together.

II. By making a mixture of three resins water-miscible and dispersing the mixture in water.

III. By making mixture of two of the resins water-miscible, dispersing the mixture in water, making the remaining resin water-miscible, dispersing the resin in water, and mixing the dispersions together. (The two resins can be selected from among the three resins as desired.)

In any of the methods I, II and III, the resin is made water-miscible by adding a neutralizing agent and/or a surfactant thereto. When the resin contains carboxyl in an amount sufficient to ionize the resin by neutralization and make the resin water-miscible, the resin can be rendered water-miscible by adding the neutralizing agent only without using the surfactant, but the surfactant may be used conjointly when required. On the other hand, when the resin is free from carboxyl or when the resin contains carboxyl in an amount insufficient to ionize the resin by neutralization and make the resin water-miscible, the surfactant is used. In this case, the neutralizing agent is also usable. However, there is no need to use the surfacent, for example, in the method (II) or (III) when one of the resins dispersed as mixed together in water is free from carboxyl but is made water-dispersible by the acid group of the other resin or one of the other resins which contains carboxyl and which is neutralized by the neutralizing agent.

The neutralizing agent to be used for neutralization is any one of primary amines, secondary amines and tertiary amines. Examples of useful amines are as follows.

(1) Primary amines such as methylamine, ethylamine, nor iso-propylamine, monoethanolamine and n- or isopropanolamine.

(2) Secondary amines such as diethylamine, diethanolamine, di-n- or iso-propanolamine and N-ethylethanolamine.

(3) Primary or secondary polyamines such as ethylenediamine, diethylenetriamine, hydroxyethylaminoethylamine, ethylaminoethylamine, methylaminopropylamine, dimethylaminoethylamine and dimethylaminopropylamine.

(4) Tertiary amines including trimethylamine, triethylamine, triisopropylamine, tri-n-propylamine, tri-n-butylamine and like trialkylamines; N-methylmorpholine, N-ethylmorpholine and like N-alkylmorpholines; N,N-dimethylethanolamine, N,N-diethylethanolamine, N-methyldiethanolamine and like tertiary alkylalkanolamines; N-methylvinylpyrrolidone and like N-alkylvinylpyrrolidones. Especially preferable among these amines are tertiary amines such as trialkylamines and N-alkylvinylpyrrolidones. The neutralizing agent is used in an amount of 0.5 to 2.0 equivalents, preferably 0.8 to 1.4 equivalents, per equivalent of carboxyl.

The surfactant to be used is any of anionic, cationic and nonionic surfactants. Examples of preferred surfactants are nonionic surfactants such as addition products of ethylene oxide to a higher alcohol, alkylphenol, arylphenol or polypropylene glycol; and anionic surfactants such as sulfuric acid ester salts or alkylbenzensulfonic acid salts of ethylene oxide adducts of alkylphenols or higher alcohols. Among these, the nonionic surfactants are more preferred. These surfactants can be used singly, or at least two of them are usable in admixture. From the viewpoint of water resistance of coatings, the surfactant is used in a proportion of up to about 10 parts by weight, preferably up to about 5 parts by weight, per 100 parts by weight of the resin solids.

In the case where the urethane resin is obtained by the chain lengthening reaction of the isocyanate-containing prepolymer, the chain of the prepolymer may be lengthened in water in the step of making the resin water-miscible and dispersing the resin in water, or the chain may be lengthened in advance, and the resin obtained is made water-miscible and dispersed in water. In the former case, the prepolymer can be dispersed in water and subjected to the chain lengthening reaction in the presence or absence of the other resin(s) (the olefin resin and/or the epoxy resin).

In the case where the prepolymer is dispersed in water using a neutralizing agent and has its chain lengthened at the same time, a tertiary amine having no active hydrogen atom is suitable to use as the neutralizing agent. The neutralizing agent is used when at least one of the urethane resin, olefin resin and urethane prepolymer has an acid group. Usable as such amines are those already exemplified. Preferable among these are trialkylamines and N-alkylvinylpyrrolidones, of which triethylamine is more preferable. The amount of neutralizing agent to be used in this case is also about 0.5 to about 2.0 equivalents, preferably about 1 to about 1.5 equivalents, per equivalent of carboxyl.

In the case where the urethane resin for use in the present composition is prepared by the chain lengthening reaction in water, the resin has good water-miscibility, assists in dispersing the whole system of composition and stabilizes the dispersed resin particles, further resulting in the advantage that coatings can be obtained easily which are excellent in water resistance, appearance and other properties. The polyurethane polymer obtained by the chain lengthening reaction is more preferably one having an acid group in view of water miscibility.

Calculated as resin solids, the proportions of olefin resin, urethane resin and epoxy resin providing the coating composition are preferably as follows.

Olefin resin: 5–40 wt. %, more preferably 10–30 wt. %

Urethane resin: 90–40 wt. %, more preferably 80–55 wt.%

Epoxy resin: 5–20 wt. %, more preferably 10–15 wt. %

Use of less than 5 wt. % of the olefin resin is undesirable since the coating then exhibits reduced adhesion to plastics substrates, especially to polypropylene resin, whereas presence of more than 40 wt. % of the resin is also undesirable since lower water resistance will result. Use of less than 40 wt. % of the urethane resin is undesirable because the composition then exhibits lower storage stability and forms coatings of lower impact resistance and impaired adhesion to overcoats. Presence of less than 5 wt. % of the epoxy resin results in reduced water resistance and lower adhesion to plastics substrates, whereas more than 20 wt. % of epoxy resin is not desirable since the coating then formed is tacky and lower in weather resistance.

Because olefin resins are generally low in water miscibility, the urethane resin for use in the present composition can be the combination of a urethane resin (hereinafter referred to as "urethane resin A") for assisting in making the olefin resin water-miscible and giving improved stability to the olefin resin particles dispersed in water, and a water-miscible urethane resin (hereinafter referred to as "urethane resin B") for imparting improved properties to the coating to be formed. An example of preferred combination is that of a urethane resin serving as the urethane resin A and prepared from an aliphatic or alicyclic polyol as the active hydrogen-containing compound (1) and an aliphatic or alicyclic diisocyanate as the polyisocyanate compound (2), and a urethane resin serving as the urethane resin B, prepared, for example, using a predominant amount of aromatic diisocyanate as the compound (2) and having a number average molecular weight of 20,000 to 100,000. The urethane resin A in this case is more preferably one which is subjected to a chain lengthening reaction in water in the presence of the olefin resin.

Calculated as resin solids, the ratio of vehicle components of the present composition, i.e., the ratio of olefin resin/urethane resin A/urethane resin B/epoxy resin, is preferably 5–40 wt. %/10–40 wt. %/0–80 wt. %/5–20 wt. %, more preferably 10–30 wt. %/20–30wt. %/25–60 wt. %/10–15 wt. %.

The resin of the composition of the invention, i.e., the vehicle component dispersed in water, is preferably about 0.001 to about 5 μm, more preferably about 0.05 to about 2.0 μm, in mean particle size from the viewpoint of storage stability, compatibility, smoothness of coatings obtained, etc.

It is possible to incorporate into the composition of the invention a coloring pigment, extender pigment, leveling agent, fluidity adjusting agent, plasticizer, etc.

A coating is formed on plastics substrates with use of the coating composition of the invention by applying the composition to the substrate, drying the coating, applying an intermediate coating composition to the coated substrate when required, applying a top coat composition directly to the coating of the composition of the invention or to the intermediate coating before or after the intermediate coating is dried, and drying the resulting coating.

The plastics substrates to be coated with the present composition are not limited specifically. Examples of such substrates are those made of polypropylene, ethylene-propylene copolymer, EPDM, polyamide, polyester, polyphenylene oxide, acrylonitrile-styrene-butadiene copolymer, polycarbonate, ethylene-vinyl acetate copolymer, unsaturated polyester, polyurethane, reinforced polyurethane and like plastics. When required, these plastics substrates are used as washed or chemically treated with an alkali, acid, organic solvent or the like.

The coating composition of the present invention is used usually as adjusted to a solids content of about 20 to about 50 wt. % and to a viscosity of about 500 to about 2000 centipoises (Brookfield type viscometer, rotational speed 6 rpm).

The method of applying the coating composition of the invention to plastics substrates is not limited specifically. Examples of useful methods are spray coating, brush coating, dip coating, electrostatic coating, etc. It is suitable that the thickness of coatings be usually about 5 to about 50 μm, preferably 10 to 20 μm, when the coating is dried. The coating can be dried at room temperature to 160° C., preferably at about 80° to about 120° C.

The intermediate coat composition usable is one already known and excellent in adhesion, smoothness, distinctness-of-image gloss, weather resistance, etc. For example, a thermosetting intermediate coat composition is useful which contains a vehicle comprising an amino resin, and a short-oil or ultrashort-oil alkyd resin up to 30% in oil length or an oil-free polyester resin. The alkyd resin or polyester resin is preferably one having a hydroxyl value of 60 to 140 and an acid value of 5 to 200 and modified with an unsaturated oil (or unsaturated fatty acid). Examples of suitable amino resins are an alkyletherified melamine resin (the alkyl preferable has 1 to 5 carbon atoms), urea resin, benzoguanamine resin, etc. Calculated as solids, the proportions of these resins by weight are preferably 65 to 85%, more preferably 70 to 80%, of the alkyd resin and/or the oil-free polyester resin, and 35 to 15%, more preferably 30 to 20%, of the amino resin. The amino resin can be replaced partly or wholly by a polyisocyanate compound or blocked polyisocyanate compound.

The intermediate coat can be of any of the conventional types, such as organic solvent type, nonaqueous dispersion type, high-solid type, aqueous solution type, aqueous dispersion type and powder type. When required, an extender pigment, coloring pigment and other additives for coating compositions can be incorporated into the intermediate coat composition.

The intermediate coat composition, which is applied to the coating formed by the present coating composition, can be applied by the same method as stated above. The thickness of the intermediate coat as cured is preferably 10 to 50 μm. The curing temperature of the coat, which varies with the vehicle, is preferably 60° to 160° C., more preferably 80° to 150° C., when heat is applied for curing.

The top coat composition is applied to the coating formed by the composition of the invention or to the intermediate coat to impart an esthetic effect to the coated article. The top coat composition usable is one already known and capable of forming coatings which are excellent in finished appearance (distinctness-of-image gloss, smoothness, gloss, etc.), weather resistance (gloss retentivity, color retentivity, chalking resistance, etc.), chemical resistance, water resistance, moisture resistance, curability, etc. Examples of useful top coat compositions are those which contain a vehicle comprising an amino-acrylic resin, amino-alkyd resin, amino-polyester resin or the like. The amino resin can be replaced partly or wholly by a polyisocyanate compound or blocked polyisocyanate compound. The composition is not limited specifically in form and can be of any desired type, such as organic solvent type, nonaqueous dispersion type, aqueous solution or dispersion type, powder type or high-solid type. The coating is dried or cured at room temperature, with heat or irradiation with active energy radiation.

The top coat composition for use in the present invention may be an enamel composition prepared by admixing a metallic pigment and/or a coloring pigment to the composition comprising the above vehicle as its main component, or a clear coating composition completely or almost free from these pigments. Top coats are formed with use of such compositions, for example, by the following methods.

(a) A metallic coating composition containing a metallic pigment and, when required, a coloring pigment, or a solid color coating composition containing a coloring pigment is applied to the undercoat or intermediatecoat and cured by heating (metallic or solid color finish by one-coat one-bake method).

(b) The metallic coating composition or the solid color coating composition is applied to the undercoat or intermediatecoat and cured by heating, and a clear coating composition is further applied to the coating and cured by heating (metallic or solid color finish by two-coat two-bake method).

(c) The metallic coating composition or the solid color coating composition is applied to the undercoat or intermediatecoat, the clear coating composition is subsequently applied to the coating, and the two coatings are thereafter cured at the same time by heating (metallic or solid color finish by two-coat one-bake method).

These top coat compositions are applied preferably by spray coating or electrostatic coating. The thickness of the top coat as dried is preferably as follows. In the method (a), the composition is applied to 25 to 40 μm. In the methods (b) and (c), the metallic coating composition and the solid color coating composition are applied to 10 to 30 μm, and the clear coating composition is applied to 25 to 50 μm, respectively. These coatings are baked for curing generally at 60° to 160° C., preferably at 100° to 150° C., for 10 to 40 minutes, although the baking condition is variable as desired according to the material of the substrate and the vehicle.

When the coating composition of the invention has an electrically conductive powder incorporated therein, the plastic substrate coated with the composition can be further coated with an intermediate or top coat composition electrostatically.

EXAMPLES

The present invention will be described below in greater detail with reference to Preparation Examples, Examples and Comparative Examples, in which the parts and percentages are all by weight.

Preparation Example of Urethane Prepolymer (A-1)

Into a polymerization reactor was placed a starting material (NCO/OH=1.57) comprising 225 parts of polyester diol (I) having a number average molecular weight of about 2000, i.e., a condensation polymer of butanediol and adipic acid, 375 parts of polycaprolactone diol (II) having a number average molecular weight of about 2000, 26.6 parts of 1,4-cyclohexanedimethanol, 60.4 parts of dimethylolpropionic acid and 313 parts of isophorone diisocyanate. The material was heated to 50° C. with stirring in a nitrogen gas atmosphere, 0.05 part of dibutyltin oxide was then added to the material as a polymerization catalyst, and the material was thereafter reacted at 70° C. for 1 hour to obtain urethane prepolymer (A-1) having an NCO group at the terminal position and containing 3.8% of NCO groups. The polymer was about 2150 in number average molecular weight.

Preparation Example of Urethane Resin Solution (A-2)

Into a polymerization reactor was placed a starting material (NCO/OH=0.975) comprising 256 parts of polyester diol (I), 427 parts of polycaprolactone diol (II), 30 parts of 1,4-cyclohexanedimethanol, 68 parts of dimethylolpropionic acid and 219 parts of isophorone diisocyanate. The material was heated with stirring while introducing nitrogen gas into the reactor. Upon the temperature of the material reaching 50° C., 0.05 part of dibutyltin oxide was added to the material, followed by reaction at 80° C. for 4 hours. With the temperature thereafter lowered to 60° C., 50 parts of methanol was added to the reaction mixture to inactivate the unreacted NCO groups. Subsequently, 345 parts of acetone and 105 parts of N-methyl-vinylpyrrolidone were added to the mixture, followed by continued stirring until a uniform solution was obtained. Thus, urethane resin solution (A-2) was prepared which contained 67% of solids. The resin had a number average molecular weight of about 25000.

Preparation Example of Urethane Prepolymer (A-3)

Into a polymerization reactor was placed a starting material (NCO/OH=1.33) comprising 476 parts of polytetramethylene glycol having a molecular weight of about 2000, 130 parts of "K-FLEX188"(a linear polyester having terminal cyclohexanedimethanol, product of KING Industries Inc. Co.) having a molecular weight of 435, 26 parts of 1,4-cyclohexane diisocyanate, 63 parts of dimethylolpropionic acid, 3.5 parts of glycerin, 184 parts of tolylene diisocynate (TDI) and 117 parts of isophorone diisocyanate (IPDI). The same procedure as in Preparation Example of prepolymer (A-1) was thereafter repeated to obtain urethane prepolymer (A-3) having an NCO end group in an NCO content of 3.1%.

Preparation Example of Olefin Resin Solution (B-1)

Into a reactor were placed 500 parts of maleinized chlorinated polypropylene (containing 25% of chlorine and 2.0% of maleic anhydride) having a number average molecular weight of about 10,000, 150 parts of n-heptane and 50 parts of N-methylvinylpyrrolidone, which were then stirred at 70° C. in a nitrogen atmosphere to prepare a uniform solution, i.e., olefin resin solution (B-1).

Preparation Example of Olefin Resin Solution (B-2).

Into a reactor were placed 700 parts of resin solution having a solids content of 50% and prepared by dissolving chlorinated polypropylene resin (about 5800 in number average molecular weight (Mn) and 26% in chlorine content) in toluene, and 350 parts of butyl cellosolve, which were heated to 100° C. Subsequently added dropwise to the mixture over a period of three hours was a mixture of 52 parts of acrylic acid, 130 parts of styrene, 468 parts of n-butyl acrylate, 69 parts of benzoyl peroxide paste containing 75% of effective component and 50 parts of isopropanol. The resulting mixture was aged at the same temperature for 1 hour. Subsequently, a solution of 3.25 parts of azobisisovaleronitrile in 50 parts of butyl cellosolve was added dropwise to the mixture over a period of 1 hour. The mixture was maintained at the same temperature for 1 hour and then heated to an elevated temperature of 110° C. to remove the unreacted monomers, water, isopropanol and toluene in a vacuum, giving resin solution (B-2) having a solids content of 70% and a resin acid value of 40.5.

Preparation Example of Epoxy Resin Solution (C-1)

Into a reactor were placed 800 parts of epoxy resin of the hydrogenated bisphenol A type (product of Tohto Kasei Co., Ltd, brand name "Sun Tohto ST-3000," about 450 in molecular weight and about 280 in epoxy equivalent) and 200 parts of butyl cellosolve, which were then fully stirred at 50° C. for 1 hour to obtain epoxy resin solution (C-1) having a solids content of 80%.

Preparation Example of Urethane Resin Emulsion (a-1)

Into a reactor were placed 350 parts of urethane prepolymer (A-1), 115 parts of acetone and 35 parts of N-methylpyrrolidone, which were then made into a uniform solution at 50° C. With stirring, 14.5 parts of triethylamine was added to the solution, 550 parts of deionized water was added to the mixture as held at 50° C., and the mixture was continuously stirred for 2 hours to complete a chain lengthening reaction in the water.

The mixture was distilled in a vacuum at a temperature of not higher than 80° C. to remove acetone until 115 parts of distillate was obtained, whereby 950 parts of urethane resin emulsion (a-1) was obtained which had a solids content of 37%. The resin was about 32,000 in number average molecular weight and 0.1 μm in mean particle size.

Preparation Example of Urethane Resin Emulsion (a-2)

Into a reactor was placed 528.5 parts of urethane resin (A-2), 14.5 parts of triethylamine was added to the resin with stirring at 50° C., 620 parts of deionized water was further added slowly to the mixture as maintained at 50° C., and the resulting mixture was continuously stirred for 1 hour. The reaction mixture was then distilled in a vacuum at 70° C. to remove acetone and methanol until 139 parts of distillate was obtained, whereupon the distillation was discontinued, affording urethane resin emulsion (a-2) having a solids content of 35% and an organic solvent content of 14.6 PHR. The resin was 0.05 μm in mean particle size.

Preparation Example of Urethane Resin Emulsion (a-3)

Urethane resin emulsion (a-3) having a solids content of 38% was prepared in the same manner as in Preparation Example of emulsiton (a-1) except that urethane prepolymer (A-3) was used in place of prepolymer (A-1). The resin was about 43,000 in molecular weight and 0.07 μm in mean particle size.

Preparation Example of Olefin Resin Emulsion (b-1)

Into a reactor was placed 700 parts of olefin resin solution (B-1). With the solution maintained at 50° C., 10.6 parts of triethylamine and 5 parts of "Noigen EA-140" (polyethyleneglycol nonylphenyl ether, nonionic surfactant, HLB14, product of Dai-ichi Kogyo Seiyaku Co., Ltd.) were added to the solution, followed by stirring for 1 hour. Thereafter 2000 parts of deionized water was slowly added to the mixture, followed by stirring for 1 hour. The reaction mixture was subsequently distilled in a vacuum at 70° C. to remove n-heptane and water until 600 parts of distillate was obtained, giving olefin resin emulsion (b-1) having a solids content of 23.6%. The resin was 1.8 μm in mean particle size.

Preparation Example of Olefin Resin Emulsion (b-2)

Into a reactor was placed 1700 parts of olefin resin solution (B-2). While fully stirring the solution, dimethylethanolamine was added to the solution in an amount of 1.0 neutralization equivalent based on the carboxyl of the resin solution, and 2075 parts of deionized water was further added to obtain emulsion (b-2) having a solids content of 28.2% and an olefin resin/acrylic resin solids ratio of 35/65. The mean resin particle size was 2.0 μm.

Preparation Example of Epoxy Resin Emulsion (c-1)

Into a reactor were placed 111 parts of epoxy resin solution (C-1) and 5.5 parts of "Noigen EA-140", and the mixture was thoroughly stirred at 50° C. for 1 hour. With continued stirring, 83.5 parts of deionized water was added dropwise to the mixture over a period of 1 hour to obtain epoxy resin emulsion (c-1). The resin had a mean particle size of 0.22 μm.

Preparation Example of Emulsion (d-1)

Into a reactor were placed 262.5 parts of urethane prepolymer (A-1), 122.5 parts of olefin resin solution (B-1), 26.3 parts of N-methylvinylpyrrolidone and 43.8 parts of methyl ethyl ketone, which were then stirred at 70° C. in a nitrogen gas atmosphere to obtain a uniform solution. To the solution thereafter cooled to 50° C. was added 14.5 parts of triethylamine with stirring, and 550 parts of deionized water was added to the mixture as maintained at 50° C., followed by continued stirring for 2 hours to complete a chain lengthening reaction.

The reaction mixture was distilled in a vacuum at a temperature not higher than 85° C. to remove heptane and methyl ethyl ketone until 70 parts of distillate was obtained, whereby emulsion (d-1) was prepared which had a solids content of 36.8% and an organic solvent content of 10 PHR. The emulsion was 0.5 μm in mean particle size.

Preparation Example of Emulsion (d-2)

Into a reactor were placed 112 parts of urethane resin solution (A-2) and 35 parts of olefin resin solution (B-1). While maintaining the mixture at 50° C. with stirring, 3.1 parts of triethylamine and 0.25 part of "Noigen EA-140" were added thereto, followed by continued stirring for 1 hour and by the addition of 127.4 parts of deionized water over a period of 1 hour. The reaction mixture was distilled in a vacuum at 70° C. until 29.6 parts of distillate (acetone and methanol) was obtained, affording emulsion (d-2) having a nonvolatile content of 39.0% (olefin resin/urethane resin ratio=25/75) and an organic solvent content of 17.4 PHR. The emulsion had a mean resin particle size of 0.8 μm.

Preparation Example of Emulsion (d-3)

Into a reactor were placed 175 parts of urethane prepolymer (A-1), 245 parts of olefin resin solution (B-1), 17.5 parts of N-methylvinylpyrrolidone and 43.8 parts of methyl ethyl ketone. A chain lengthening reaction was conducted in water in the same manner as in Preparation Example of emulsion (d-1) with the exception of using 11.96 parts of triethylamine and 1.75 parts of "Noigen EA-140". The reaction mixture was distilled in a vacuum to remove heptane and methylethyl ketone and obtain emulsion (d-3) having a nonvolatile content of 36.9% (olefin resin/urethane resin ratio=50/50) and a solvent content of 10 PHR. The emulsion was 0.9 μm in mean resin particle size.

Preparation Example of Emulsion (d-4)

Into a reactor were placed 75 parts of urethane resin solution (A-2) and 71.4 parts of olefin resin solution (B-2). While maintaining the mixture at 50° C. with stirring, 3.1 parts of triethylamine and 0.25 parts of "Noigen EA-140" were added to the mixture, followed by stirring for 1 hour and further by the addition of 150 parts of deionized water over a period of 1 hour. The reaction mixture was distilled in a vacuum at 110° C. to remove acetone, methanol, toluene and some water until 46.4 parts of distillate was obtained, giving emulsion (d-4) having a nonvolatile content of 40.0% (olefin resin/urethane resin solids ratio=50/50) and an organic solvent content of 13.4 PHR. The emulsion was 0.38 μm in mean resin particle size.

Preparation Example of Emulsion (d-5)

Into a reactor were placed 97 parts of urethane resin solution (A-2), 35 parts of olefin resin solution (B-1) and 12.5 parts of epoxy resin solution (c-1). While maintaining the mixture at 50° C. with stirring, 3.1 parts of triethylamine and 0.27 part of "Noigen EA-140" were added to the mixture, followed by stirring for 1 hour and thereafter by the addition of 141.1 parts of deionized water over a period of 1 hour. The reaction mixture was then distilled in a vacuum to remove acetone, methanol, n-heptane and some water until 53.1 parts of distillate was collected, affording emulsion (d-5) having a nonvolatile content of 43.0% (olefin resin/polyurethane resin/epoxy resin solids ratio=25/65/10) and an organic solvent content of 11.8 PHR. The emulsion had a mean resin particle size of 0.41 μm.

Preparation of Coating Compositions

Using the emulsions obtained by Preparation Examples given above, coating compositions of the invention (compositions (E-1) to (E-9)) and comparative coating compositions (compositions (E-10) to (E-12)) were prepared.

| *Composition (E-1) | |
| --- | --- |
| Urethane resin emulsion (a-1) | 162.2 parts |
| Olefin resin emulsion (b-1) | 127.1 parts |
| Epoxy resin emulsion (c-1) | 17.2 parts |
| Titanium white | 100 parts |
| Carbon black | 0.3 part |

These ingredients were thoroughly kneaded together to obtain gray coating composition (E-1).

*Compositions (E-2)–(E-12)

Compositions (E-2) to (E-12) were prepared in the same manner as composition (E-1) with the exception of using the ingredients listed in Table 1 in the listed amounts.

The emulsion (222.7 parts), 100 parts of titanium white and 0.3 part of carbon black were thoroughly kneaded together to prepare gray coating composition (E-13).

*Composition (E-14)

"Soflex #2582" (gray undercoat composition of the modified polyolefin resin lacquer type, product of Kansai Paint Co., Ltd.) was diluted to a viscosity of Ford cup #4, 13 to 14 sec. at 20° C.

Compositions (E-1) to (E-13) were adjusted to a viscosity of 1000 centipoises (Brookfield type viscometer, 20° C.) with deionized water and thereafter used for coating.

Compositions (E-1) to (E-14) and coatings prepared from these compositions were tested for properties with the results given in Table 2. The test methods are as follows.

(*1) Storage stability

The coating composition was placed into a closed container of polyethylene, then allowed to stand at 40° C. for 1 month and thereafter checked for abnormalities, such as sedimentation of the pigment, separation of the resin from the solvent and viscosity changes, according to the following criteria.

ⓞ: Free from abnormalities such as a viscosity change, separation of the resin from the solvent and sedimentation of the pigment.

Δ: slightly noticeable abnormalities.

V: Viscosity change of at least 500 centipoises (20°

TABLE 1

| Emulsion/pigment | | E-1 | E-2 | E-3 | E-4 | E-5 | E-6 | E-7 | E-8 | E-9 | E-10 | E-11 | E-12 |
| --- | --- | --- | --- | --- | --- | --- | --- | --- | --- | --- | --- | --- | --- |
| Urethane resin | (a-1) | 162.2 | | | | | | | | | | | 135.1 |
| emulsion | (a-2) | | 185.7 | | | | | | | | | | |
| | (a-3) | | | | | | | | 157.9 | 78.9 | | | |
| Olefin resin | (b-1) | 127.1 | 127.1 | | | | | | | | 423.7 | | 211.9 |
| emulsion | (b-2) | | | | | | | | | | | 354.6 | |
| Epoxy resin Emulsion | (c-1) | 17.2 | 8.6 | 8.6 | 17.2 | 8.6 | 17.2 | | 17.2 | | | | |
| Resin mixture | (d-1) | | | 258.1 | | | | | | | | | |
| emulsion | (d-2) | | | | 230.8 | | | | | | | | |
| | (d-3) | | | | | 257.5 | | | | 81.3 | | | |
| | (d-4) | | | | | | | 225 | | | | | |
| | (d-5) | | | | | | | | 232.6 | | 162.8 | | |
| Titanium white | | 100 | 100 | 100 | 100 | 100 | 100 | 100 | 100 | 100 | 100 | 100 | 100 |
| Carbon black | | 0.3 | 0.3 | 0.3 | 0.3 | 0.3 | 0.3 | 0.3 | 0.3 | 0.3 | 0.3 | 0.3 | 0.3 |

Further comparative coating compositions (compositions (E-13) and (E-14)) were prepared by the procedures described below.

*Composition (E-13)

polytetramethylene glycol (1020.0 parts, brand name, "PTG-500", product of Hodogaya Chemical Co., Ltd.) having an OH value of 55 was dehydrated in a vacuum of 1 mm Hg at 100° C., and 178.6 parts of tolylene diisocyanate was thereafter added to the glycol as cooled to 40° C., followed by reaction at 85° C. for 3 hours to obtain a polyurethane prepolymer. A half ester compound (49.9 parts) having an acid value of 233.8 and prepared from 134.0 parts of trimethylolpropane and 98.0 parts of maleic anhydride was added to the polyurethane prepolymer and reacted therewith at 85° C. for 3 hours in a nitrogen stream to prepare a carboxyl-containing prepolymer having an isocyanate end group. The prepolymer was maintained at 85° C. and poured into 1534 parts of an aqueous solution containing 8.2 parts of sodium hydroxide while being mixed therewith by a homomixer to obtain a milky white polyurethane emulsion having a solids content of 44.9%.

C.).

G: Gelation.

Ss: Marked separation of the solvent.

Sp: Marked sedimentation of the pigment.

$S_R$: Marked precipitation of the resin.

(*2) Nonvolatile content

The coating composition was diluted and adjusted to a viscosity of 1000 centipoises (Brookfield type viscometer, at 6 rpm/25° C.), and used for coating. The nonvolatile content of the diluted composition is listed.

(*3) Amount of organic solvent vaporized

The amount of organic solvent vaporized from the composition as applied. The value listed is the amount (mg) of organic solvent evaporated off when 1 cm³ of dry coating was formed.

(*4) Elongation at break

The composition was applied to a substrate by spray coating to a thickness of about 20 μm when dried. The coating was dried at 80° C. for 40 minutes, then separated off and tested by a universal tensile tester equipped with a constant-temperature chamber ("Autograph Model S-D", product of Shimadzu Corporation).

The test piece was 20 mm in length. The measurement listed was obtained at a tension rate of 20 mm/min.

(*5) Tackiness

The coating composition was applied to a substrate by spray coating and baked at 80° C. for 30 minutes to prepare a test panel, which was then allowed to stand in an atmosphere of 30° C., 85% RH for 1 hour. The tackiness of the coating was thereafter determined by touching the coating with the finger in the same atmosphere.
⊚: Not tacky.
Δ: Slightly tacky.
X: Tacky.

For degreasing, the substrates A to C, E and F were exposed to an atmosphere of 1,1,1-trichloroethane vapor for 1 minute, while the substrate D was wiped with cloth wet with isopropyl alcohol.

(III) Undercoating

Each of compositions (E-1) to (E-14) was applied to the substrate by spray coating at an air pressure of 4 kg/cm² to a thickness of 15 to 20 μm when dried, allowed to stand at room temperature for 30 minutes and dried at 80° C. for 40 minutes.

(IV) Formation of top coat (a) A top coat composition, "Soflex #200" White

TABLE 2

| Properties | Composition of the Invention | | | | | | | | |
|---|---|---|---|---|---|---|---|---|---|
| | E-1 | E-2 | E-3 | E-4 | E-5 | E-6 | E-7 | E-8 | E-9 |
| Composition | | | | | | | | | |
| Resin ratio | | | | | | | | | |
| Olefin | 30 | 30 | 23.8 | 22.5 | 47.5 | 45 | 25 | 15 | 17.5 |
| Urethane | 60 | 65 | 71.2 | 67.5 | 45.7 | 45 | 65 | 75 | 75.5 |
| Epoxy | 10 | 5 | 5 | 10 | 5 | 10 | 10 | 10 | 7 |
| Storage Stability (*1) | ⊚ | ⊚ | ⊚ | ⊚ | ⊚ | ⊚ | ⊚ | ⊚ | ⊚ |
| Nonvolatile content (%) (*2) | 41.8 | 40.4 | 46.3 | 48.9 | 46.4 | 49.6 | 51.1 | 47.7 | 49.7 |
| Amount of solvent vaporized (*3) | 153 | 186 | 144 | 246 | 144 | 198 | 157 | 153 | 150 |
| Coating | | | | | | | | | |
| Elongation at break at 20° C. (*4) | 280 | 290 | 330 | 320 | 220 | 230 | 320 | 420 | 370 |
| Tackiness (*5) | ⊚ | ⊚ | ⊚ | ⊚ | ⊚ | ⊚ | ⊚ | ⊚ | ⊚ |

| Properties | Comparative Composition | | | | |
|---|---|---|---|---|---|
| | E-10 | E-11 | E-12 | E-13 | E-14 |
| Composition | | | | | |
| Resin ratio | | | | | |
| Olefin | 100 | 100 | 50 | 0 | 100 |
| Urethane | 0 | 0 | 50 | 100 | 0 |
| Epoxy | 0 | 0 | 0 | 0 | 0 |
| Storage Stability (*1) | G | Δ | ⊚ | ⊚ | ⊚ |
| Nonvolatile content (%) (*2) | 32.4 | 37.4 | 38.0 | 53.4 | 19.8 |
| Amount of solvent vaporized (*3) | 133 | 572 | 133 | 0 | 6400 |
| Coating | | | | | |
| Elongation at break at 20° C. (*4) | 120 | 90 | 180 | 300 | 210 |
| Tackiness (*5) | Δ | Δ | ⊚ | ⊚ | Δ |

Forming Coatings and Testing Coatings for Properties

Plastics substrates were coated with compositions (E-1) to (E-14) and top coat compositions by the following methods. The coatings were tested for properties by the methods described below.

(I) Substrates

Substrate A: Polypropylene ("TX-933", product of Mitsubishi Petrochemical Co., Ltd.)
Substrate B: Reinforced-Reaction Injection Molding-Polyurethane R-RIM-PU ("BF-110-5OIMR", product of Sumitomo Bayer Urethane Co., Ltd.)
Substrate C: Polyester ("Bexloy", product of E. I. Du Pont, de nemours & Co.)
Substrate D: ABS
Substrate E: Polyphenylene Oxide ("GTX 910", product of Engineering Plastics, Ltd.)
Substrate F: Sheet Molding Compound SMC (II) Degreasing (2-pack solvent-type polyester-urethane resin composition, product of Kansai Paint Co., Ltd.) was applied to the coating formed by the method (III), by spray coating at an air pressure of 4 kg/cm² to a thickness of 30 to 40 μm when dried, set at room temperature for 30 minutes and thereafter forcibly dried at 80° C. for 40 minutes. The coated substrate was tested for properties with the result given in Table 3.

(b) A top coat composition, "Soflex #1400" Silver (solvent-type amino-polyester resin composition, product of Kansai Paint Co., Ltd.) was applied to the coating formed by the method (III) to a thickness (dry) of 15 to 20 μm by spray coating, and then allowed to stand at room temperature for 3 minutes. Subsequently, "Soflex #1600" Clear (solvent-type amino-acrylic resin composition, product of Kansai Paint Co., Ltd.) was applied to the resulting coating to a thickness (dry) of 30 to 35 μm by spray coating, allowed to stand at room temperature for 20 minutes, then dried at 120° C. for 40 minutes and thereafter tested for properties.
Table 4 shows the result.

(c) The coating formed by the method (III) was coated with aqueous metallic coating composition (+)-1, described below, to a thickness (dry) of 15 to 20 μm and subsequently with clear coating composition (+)-2 of the organic solvent dilution type, in a wet-on-wet manner to a thickness of 35 to 40 μm, and thereafter baked at 140° C. for 20 minutes to form a top coat. The coated substrate was tested for properties with the result given in Table 5.

The top coat compositions (+)-i and (+)-2 were prepared by the following procedures.

Aqueous metallic coating composition (+)-i
A mixture was prepared from:
(A) 175 parts of acrylic resin emulsion having a mean particle size of 0.1 μm and solids content of 20% and prepared by the emulsion polymerization of a monomer mixture (0.63 mmole/g in hydroxyl concentration and 0.15 mmole/g in carboxyl concentration) of methyl methacrylate, styrene, n-butyl acrylate, acrylic acid, 2-hydroxylethyl acrylate and 2-ethylhexyl acrylate,
(B) 71.4 parts of urethane resin emulsion having a solids content of 42.0% and obtained by subjecting a urethane prepolymer to a chain lengthening reaction in water, the prepolymer being prepared from polyester diol (I), polycaprolactone diol (II), dimethylolpropionic acid, 1,4-butanediol and isophorone diisocyanate,
(C) 3 parts of "Acrysol ASE-60" (tackifier, product of Rohm & Haas Co., Ltd.)
(D) 31 parts of "Cymel 325" (water-soluble melamine resin, product of Mitsui-Cyanamid, Ltd.), and
(E) 23 parts of aluminum paste (65% in metal content), by uniformly mixing the ingredients together, and diluting the mixture with deionized water to obtain an aqueous metallic base coat composition having a viscosity of 3000 centipoises (Brookfield type viscometer, at 6 rpm). Clear coating composition (+)-2

A mixture was prepared from 41.7 parts of "U-van 20SE" (melamine resin, product of Mitsui Toatsu Chemicals, Inc.) and parts of acrylic resin xylol solution having a resin solids content of 60%, the acrylic resin having acid value of 12 and hydroxyl value of 58 and prepared by copolymerizing methyl acrylate, ethyl acrylate, n-butyl acrylate, 2-hydroxyethyl acrylate and acrylic acid. The mixture was diluted with "Swasol 1500" (organic solvent, product of Cosmo Oil Co., Ltd.) to a viscosity of Ford Cup #4 (20° C.), 25 sec. Test methods (*6) Appearance of coating
Gloss of coating: Measured according to JIS K-5400 979 6.7 (reflectance at 60 deg).
Smoothness of coating: The coating was checked for smoothness with the unaided eye according to the following criteria:
⊚: Good
X: Poor
Δ: Intermediate between good and poor
Fault in coating: The coating was checked with the unaided eye for seediness, crater, pinhole and sag.
The mark ⊚ stands for "no faults."

(*7) Adhesion
Cross cuts were formed in the coating according to JIS K 5400 (1979) 6.15, an adhesive cellophane tape was affixed to the surface of the coating and then peeled off quickly, and the coating was thereafter checked.
The value listed is the number of squares remaining on the substrate relative to the total number (100) of squares formed.

(*8) Water resistance
The test panel was immersed in water at 40° C. for 10 days, and the coating was checked immediately thereafter for gloss by the method (*6) and for adhesion by the method (*7).

(*9) Bending resistance
The test panel prepared using the substrate A, B or C was cut to the size of 20×150 mm, bent through 180° by being wound around a solid cylinder (steel) of 25.4 mm in diameter with the coating side out in an atmosphere of 20° C., and checked for flaking, cracking, crazing or the like in the coating. When required, the same procedure as above was repeated in an atmosphere of −20° C. The result was evaluated according to the following criteria.
⊚: No fault
○: Slight crazing
Δ: Fairly crazing
X: Cracking reaching to the substrate surface or flaking

TABLE 3

| Example No. | | 1 | 2 | 3 | 4 | 5 | Example 6 | 7 | 8 | 9 | 10 | 11 | 12 | Comparative Example 1 | 2 | 3 | 4 | 5 |
|---|---|---|---|---|---|---|---|---|---|---|---|---|---|---|---|---|---|---|
| Undercoat composition | | E-1 | E-2 | E-3 | E-4 | E-5 | E-5 | E-5 | E-5 | E-6 | E-7 | E-8 | E-9 | E-10 | E-11 | E-12 | E-13 | E-14 |
| Substrate | | A | A | A | A | A | B | C | D | A | A | A | A | A | A | A | A | A |
| Appearance of coating (*6) | Gloss | 93 | 92 | 92 | 91 | 90 | 90 | 93 | 93 | 93 | 92 | 92 | 92 | 86 | 90 | 93 | 91 | 92 |
| | Smoothness | ⊚ | ⊚ | ⊚ | ⊚ | ⊚ | ⊚ | ⊚ | ⊚ | ⊚ | ⊚ | ⊚ | ⊚ | Δ | Δ | ⊚ | ⊚ | ⊚ |
| | Fault | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Adhesion (*7) | | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | 0/100 | ⊚ |
| Water resistance (*8) | Appearance | 92 | 91 | 92 | 92 | 90 | 89 | 93 | 93 | 93 | 91 | 91 | 90 | 76 | 87 | 84 | 88 | 90 |
| | Adhesion | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | 0/100 | ⊚ |
| Bending resistance (*9) | 20° C. | ⊚ | ⊚ | ⊚ | ⊚ | ⊚ | ⊚ | ⊚ | — | ⊚ | ⊚ | ⊚ | ⊚ | ⊚ | ⊚ | ⊚ | X | ⊚ |
| | −20° C. | ⊚ | ⊚ | ⊚ | ⊚ | ⊚ | ⊚ | ⊚ | — | ⊚ | ⊚ | ⊚ | ⊚ | ○ | Δ | ⊚ | X | Δ |

TABLE 4

| Example No. | | 13 | 14 | 15 | 16 | 17 | 18 | 19 | 20 | 21 | 22 | 23 | 24 |
|---|---|---|---|---|---|---|---|---|---|---|---|---|---|
| Undercoat composition | | E-1 | E-2 | E-3 | E-4 | E-5 | E-5 | E-5 | E-5 | E-6 | E-7 | E-8 | E-9 |
| Substrate | | A | A | A | A | A | B | C | E | A | A | A | A |
| Appearance of coating (*6) | Gloss | 98 | 96 | 95 | 97 | 96 | 96 | 98 | 97 | 97 | 96 | 96 | 98 |
| | Smoothness | ⊚ | ⊚ | ⊚ | ⊚ | ⊚ | ⊚ | ⊚ | ⊚ | ⊚ | ⊚ | ⊚ | ⊚ |
| | Fault | ⊚ | ⊚ | ⊚ | ⊚ | ⊚ | ⊚ | ⊚ | ⊚ | ⊚ | ⊚ | ⊚ | ⊚ |
| Adhesion (*7) | | ⊚ | ⊚ | ⊚ | ⊚ | ⊚ | ⊚ | ⊚ | ⊚ | ⊚ | ⊚ | ⊚ | ⊚ |
| Water resistance (*8) | Appearance | 97 | 90 | 93 | 90 | 91 | 92 | 91 | 90 | 96 | 92 | 92 | 97 |
| | Adhesion | ⊚ | ⊚ | ⊚ | ⊚ | ⊚ | ⊚ | ⊚ | ⊚ | ⊚ | ⊚ | ⊚ | ⊚ |
| Bending resistance (*9) | 20° C. | ⊚ | ⊚ | ⊚ | ⊚ | ⊚ | ⊚ | ⊚ | — | ⊚ | ⊚ | ⊚ | ⊚ |
| | −20° C. | ⊚ | ⊚ | ⊚ | ⊚ | ⊚ | ⊚ | ⊚ | — | ⊚ | ⊚ | ⊚ | ⊚ |

TABLE 5

| Example No. | | Example | | | | | | | | | | | | Comparative Example | | | | |
|---|---|---|---|---|---|---|---|---|---|---|---|---|---|---|---|---|---|---|
| | | 25 | 26 | 27 | 28 | 29 | 30 | 31 | 32 | 33 | 34 | 35 | 36 | 11 | 12 | 13 | 14 | 15 |
| Undercoat composition | | E-1 | E-2 | E-3 | E-4 | E-5 | E-5 | E-5 | E-5 | E-6 | E-7 | E-8 | E-9 | E-10 | E-11 | E-12 | E-13 | E-14 |
| Substrate | | A | A | A | A | A | B | E | F | A | A | A | A | A | A | A | A | A |
| Appearance of coating (*6) | Gloss | 96 | 96 | 96 | 97 | 96 | 96 | 96 | 96 | 96 | 96 | 96 | 97 | 98 | 96 | 96 | 97 | 97 |
| | Smoothness | ⊚ | ⊚ | ⊚ | ⊚ | ⊚ | ⊚ | ⊚ | ⊚ | ⊚ | ⊚ | ⊚ | ⊚ | Δ | Δ | ⊚ | ⊚ | ⊚ |
| | Fault | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Adhesion (*7) | | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | 0/100 | ⊚ |
| Water resistance (*8) | Appearance | 94 | 95 | 95 | 95 | 95 | 95 | 93 | 94 | 94 | 94 | 95 | 95 | 95 | 92 | 90 | 74 | 90 |
| | Adhesion | ⊚ | ⊚ | ⊚ | ⊚ | ⊚ | ⊚ | ⊚ | ⊚ | ⊚ | ⊚ | ⊚ | ⊚ | ⊚ | ⊚ | 98/100 | 0/100 | ⊚ |
| Bending resistance (*9) | 20° C. | ⊚ | ⊚ | ⊚ | ⊚ | ⊚ | ⊚ | — | — | ⊚ | ⊚ | ⊚ | ⊚ | X | X | ⊚ | X | O |

We claim:

1. An aqueous coating composition for a plastic substrate, said composition consisting essentially of:
   (a) an aqueous medium;
   (b) 5–40 wt. %, calculated as resin solids, of a water-miscible olefin resin modified with a carboxyl-containing unsaturated monomer;
   (c) 90–40 wt. %, calculated as resin solids, of at least one water-miscible urethane resin; and
   (d) 5–20 wt. %, calculated as resin solids, of a water-miscible epoxy resin,
wherein the resins (b), (c) and (d) are dispersed in said aqueous medium.

2. A composition according to claim 1, wherein said olefin resin is a chlorinated polypropylene modified with maleic acid or maleic anhydride.

3. A composition according to claim 1, wherein said urethane resin contains a carboxyl group in the molecule.

4. A composition according to claim 3, wherein said urethane resin containing a carboxyl group in the molecule has an acid value of 25–150.

5. A composition according to claim 1, wherein said urethane resin is a urethane polymer obtained by reacting an active hydrogen-containing compound having at least two active hydrogen atoms in the molecule on the average with a polyisocyanate compound or by reacting an active hydrogen-containing compound having at least two active hydrogen atoms in the molecule on the average with a polyisocyanate compound in the presence of an excessive amount of isocyanate groups to obtain an isocyanate-containing prepolymer, and reacting the prepolymer with a chain-lengthening agent.

6. A composition according to claim 5, wherein said active hydrogen-containing compound is a mixture of diol and polyol having at least three hydroxyl groups in the molecule and up to 500 in number average molecular weight, the amount of the polyol being up to about 0.1 mole per mole of the diol.

7. A composition according to claim 5, wherein said urethane resin is a urethane polymer obtained by reacting said active hydrogen-containing compound with said polyisocyanate compound in the presence of an excessive amount of isocyanate groups to obtain an isocyanate-containing prepolymer, and chain-lengthening the prepolymer in water.

8. A composition according to claim 1, wherein said epoxy resin is a polyglycidyl ether of a polyphenol.

9. A composition according to claim 1, which contains 10–30 wt. % of olefin resin, 80–55 wt. % of urethane resin and 10–15 wt. % of epoxy resin.

10. A composition according to claim 1, wherein said olefin resin, said urethane resin and said epoxy resin are dispersed in the aqueous medium in the presence of at least one member selected from the group consisting of surfactants and neutralizing agents.

11. A composition according to claim 10, wherein said neutralizing agent is a tertiary amine.

12. A composition according to claim 11, wherein said neutralizing agent is used in an amount of about 0.5 to about 2.0 Eq. per Eq. of carboxyl contained in the resin molecule.

13. A composition according to claim 1, wherein said urethane resin is a mixture of a urethane resin A prepared from an aliphatic or alicyclic polyol as an active hydrogen-containing compound and an aliphatic or alicyclic diisocyanate as a polyisocyanate compound, and a urethane resin B prepared by using a predominant amount of aromatic diisocyanate as a polyisocyanate compound and having a number average molecular weight of 20,000 to 100,00.

14. A composition according to claim 13 which contains 5-40 wt. % of olefin resin, 10-40 wt. % of urethane resin A, less than 80 wt. % of urethane resin B and 5-20 wt. % of epoxy resin.

15. A composition according to claim 14 which contains 10-30 wt. % of olefin resin, 20-30 wt. % of urethane resin A, 25-60 wt. % of urethane resin B and 10-15 wt. % of epoxy resin.

16. An aqueous coating composition for a plastic substrate, said composition consisting essentially of:
   (a) an aqueous medium;
   (b) 5-40 wt. %, calculated as resin solids, of a water-miscible olefin resin modified with a carboxyl-containing unsaturated monomer;
   (c) 90-40 wt. %, calculated as resin solids, of at least one water-miscible urethane resin;
   (d) 5-20 wt. %, calculated as resin solids, of a water-miscible epoxy resin; and
   (e) at least one pigment.
wherein the resins (b), (c) and (d) and the pigment (e) are dispersed in said aqueous medium.

17. A composition according to claim 16, wherein said olefin resin is a chlorinated polypropylene modified with maleic acid or maleic anhydride.

18. A composition according to claim 16, wherein said urethane resin contains a carboxyl group in the molecule.

19. A composition according to claim 18, wherein said urethane resin containing a carboxyl group in the molecule has an acid value of 25-150.

20. A composition according to claim 16, wherein said urethane resin is a urethane polymer obtained by reacting an active hydrogen-containing compound having at least two active hydrogen atoms in the molecule on the average with a polyisocyanate compound or by reacting an active hydrogen-containing compound having at least two active hydrogen atoms in the molecule on the average with a polyisocyanate compound in the presence of an excessive amount of isocyanate groups to obtain an isocyanate-containing prepolymer, and reacting the prepolymer with a chain-lengthening agent.

21. A composition according to claim 20, wherein said active hydrogen-containing compound is a mixture of diol and polyol having at least three hydroxyl groups in the molecule and up to 500 in number average molecular weight, the amount of the polyol being up to about 0.1 mole per mole of the diol.

22. A composition according to claim 30, wherein said urethane resin is a urethane polymer obtained by reacting said active hydrogen-containing compound with said polyisocyanate compound in the presence of an excessive amount of isocyanate groups to obtain an isocyanate-containing prepolymer, and chain-lengthening the prepolymer in water.

23. A composition according to claim 16, wherein said epoxy resin is a polyglycidyl ether of a polyphenol.

24. A composition according to claim 16, which contains 10-30 wt. % of olefin resin, 80-55 wt. % of urethane resin and 10-15 wt. % of epoxy resin.

25. A composition according to claim 16, wherein said olefin resin, said urethane resin, said epoxy resin and said pigment are dispersed in the aqueous medium in the presence of at least one member selected from the group consisting of surfactants and neutralizing agents.

26. A composition according to claim 25, wherein said neutralizing agent is a tertiary amine.

27. A composition according to claim 26, wherein said neutralizing agent is used in an amount of about 0.5 to about 2.0 Eq. per Eq. of carboxyl contained in the resin molecule.

28. A composition according to claim 16, wherein said urethane resin is a mixture of a urethane resin A prepared from an aliphatic or alicyclic polyol as an active hydrogen-containing compound and an aliphatic or alicyclic diisocyanate as a polyisocyanate compound, and a urethane resin B prepared by using a predominant amount of aromatic diisocyanate as a polyisocyanate compound and having a number average molecular weight of 20,000 to 100,00.

29. A composition according to claim 28 which contains 5-40 wt. % of olefin resin, 10-40 wt. % of urethane resin A, less than 80 wt. % of urethane resin B and 5-20 wt. % of epoxy resin.

30. A composition according to claim 29 which contains 10-30 wt. % of olefin resin, 20-30 wt. % of urethane resin A, 25-60 wt. % of urethane resin B and 10-15 wt. % of epoxy resin.

* * * * *